United States Patent
Brandl

(10) Patent No.: US 10,062,086 B2
(45) Date of Patent: Aug. 28, 2018

(54) METHOD FOR OPERATING A BONUS SYSTEM AND BONUS SYSTEM

(71) Applicant: AUDI AG, Ingolstadt (DE)

(72) Inventor: Simon Brandl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 423 days.

(21) Appl. No.: 14/561,995

(22) Filed: Dec. 5, 2014

(65) Prior Publication Data

US 2016/0162927 A1    Jun. 9, 2016

(51) Int. Cl.
*G06Q 30/00*    (2012.01)
*G06Q 30/02*    (2012.01)
*G06F 17/30*    (2006.01)

(52) U.S. Cl.
CPC ... *G06Q 30/0231* (2013.01); *G06F 17/30604* (2013.01); *G06Q 30/0233* (2013.01)

(58) Field of Classification Search
None
See application file for complete search history.

(56) References Cited

U.S. PATENT DOCUMENTS

| | | | |
|---|---|---|---|
| 6,748,305 B1 | 6/2004 | Klausner et al. | |
| 8,090,598 B2 * | 1/2012 | Bauer | G06Q 40/02 701/1 |
| 8,428,815 B2 * | 4/2013 | Van Engelshoven | G07C 5/008 340/438 |
| 8,595,034 B2 * | 11/2013 | Bauer | G06Q 40/02 434/322 |
| 2004/0153362 A1 * | 8/2004 | Bauer | G06Q 40/02 705/4 |
| 2010/0241501 A1 * | 9/2010 | Marshall | G06Q 30/00 705/14.13 |
| 2012/0158436 A1 * | 6/2012 | Bauer | G06Q 40/02 705/4 |
| 2014/0309849 A1 * | 10/2014 | Ricci | B60Q 1/00 701/33.4 |

FOREIGN PATENT DOCUMENTS

| | | | |
|---|---|---|---|
| DE | 102005040728 | 3/2007 | |
| DE | 102007018139 | 10/2008 | |
| JP | 2013117998 A | * 6/2013 | ............... G07C 5/00 |

OTHER PUBLICATIONS

Chris Woodyard et al. Your Car May Be Invading Your Privacy. USA Today Published 11:00 a.m. ET Mar. 24, 2013. Retrieved online Jun. 23, 2018. https://www.usatoday.com/story/money/cars/2013/03/24/car-spying-edr-data-privacy/1991751/ (Year: 2013).*

* cited by examiner

Primary Examiner — James A Reagan
(74) Attorney, Agent, or Firm — Staas & Halsey LLP

(57) ABSTRACT

A method for operating a bonus system includes providing a driver account associated with a driver by a database, acquiring data relating to the driver by an application installed on a mobile terminal, acquiring data on the vehicle side of at least one motor vehicle of the driver by at least one acquisition device on the motor vehicle side, transmitting the acquired data to the database, creating an electronic life career associated with the driver account based on the data transmitted to the database, and assigning respectively preset bonus points to the driver account as soon as it has been acquired based on the electronic life career that respective preset events have been achieved. Preset benefits can be redeemed depending on the bonus points assigned to the driver account.

15 Claims, 2 Drawing Sheets

METHOD FOR OPERATING A BONUS SYSTEM AND BONUS SYSTEM

BACKGROUND

The invention relates to a method for operating a bonus system and to a bonus system.

DE 10 2007 018 139 A1 shows a method and a system for managing vehicle data. Vehicle data is acquired over an entire life cycle of the vehicle and stored as well as provided for retrieval.

U.S. Pat. No. 6,748,305 B1 shows a method and a device for storing data in a vehicle and for evaluating the vehicle data. Therein, the vehicle data is acquired and stored over the entire useful life of the vehicle.

DE 10 2005 040 728 A1 shows a vehicle life career with a dialogue system. Therein, all of the variations performed on a vehicle from the manufacture thereof up to the disposal thereof are stored.

SUMMARY

It is one possible object to provide a solution, by which as much data as possible of a driver of a motor vehicle as well as data about the motor vehicle itself can be acquired.

The inventor proposes a method for operating a bonus system as well as by a bonus system.

The proposed method for operating a bonus system includes the following:
  providing a driver account associated with a driver by a database;
  acquiring data relating to the driver by an application installed on a mobile terminal;
  acquiring data on the vehicle side of at least one motor vehicle of the driver by at least one acquisition device on the motor vehicle side;
  transmitting the acquired data to the database;
  creating an electronic life career associated with the driver account based on the data transmitted to the database;
  assigning respectively preset bonus points to the driver account as soon as it has been acquired based on the electronic life career that respective preset events have been achieved, wherein preset benefits can be redeemed depending on the bonus points assigned to the driver account.

Thus, according to the proposal, it is provided to acquire data relating to a driver of a motor vehicle by an application installed on a mobile terminal. Moreover, it is provided to acquire data on the vehicle side of at least one motor vehicle of the driver by at least one acquisition device on the motor vehicle side. The respective data is transmitted to a database external to vehicle, which is preferably a server provided by the relevant automobile manufacturer of the motor vehicle, for example in terms of a cloud.

Therein, in particular automobiles and motorcycles, thus also motorbikes, are to be understood by a motor vehicle. If reference is made to motor vehicles below, this analogously applies both to automobiles and motorbikes.

Therein, a unique driver account is associated with the driver, which is provided in the database. Preferably, the vehicle-specific and the driver-specific data is continuously collected, in particular as long as the driver drives a certain make of a certain automobile manufacturer or else of an automobile group including several different automobile manufacturers. If it is made reference to an automobile manufacturer below, thereby, the case can also be meant that it is an automobile group including multiple makes of car.

Based on this collected data, an electronic life career is created, which considers all of the driver-relevant and vehicle-relevant data, which is continuously collected. Respective bonus points are assigned or credited to the driver account as soon as it has been acquired based on the electronic life career that respective preset events have been achieved. Depending on the bonus points assigned to the driver account, it is possible to the driver to redeem preset benefits, preferably by the application installed on his mobile terminal.

From the customer's point of view, thus from the point of view of the driver, thus, an individual life career in particular specific to vehicle manufacturer is offered as a benefit. In reverse thereto, the driver agrees to provide the data relating to his person and his vehicle. Due to the assignment or distribution of the bonus points depending on respectively achieved events in particular preset by a certain vehicle manufacturer, the driver is motivated to achieve these preset events as fast as possible.

From the point of view of a certain vehicle manufacturer offering the method for operating the bonus system, various advantages also arise. In that the driver, thus the customer of the relevant vehicle manufacturer, discloses information about his user behavior on intrinsic motivation, in particular the customer satisfaction, the customer excitement, the customer control, the customer retention and also certain kinds of sales channels can be improved.

For example, information with respect to the customer satisfaction with respect to services provided by the vehicle manufacturer can be collected and evaluated. Further, the customer is also excited by the achievable preset events, which can also be understood as milestones, and the bonus system behind. With respect to the customer control, the corresponding vehicle manufacturer performing the method for operating the bonus system has a comprehensive overview over the user behavior of respective customers and optionally can also control the behavior of the customers via the application installed on the mobile terminal. Further, a kind of competition optionally also arises between the customers, who can have the best electronic life career.

With respect to the customer retention, in particular the advantage arises that an increase of the likelihood and the motivation is to be expected that a customer again purchases a vehicle of the relevant vehicle manufacturer and also uses further offers of the vehicle manufacturer, in particular if they are part of the preset events or milestones.

Due to the diverse interaction possibilities between vehicle manufacturer and customer via the bonus system, the advantage optionally also arises that relevant customers generate further new customers for the vehicle manufacturer by use of the installed application.

Overall, by the method thus, a solution is provided, by which a plurality of customer-related data with respect to their motor vehicles can be obtained.

In advantageous development, it is provided that data with respect to at least one of the following things is acquired:
  retrofitting, maintenance and/or service works performed on the motor vehicle;
  with respect to the performed retrofitting, maintenance and/or service works, evaluations delivered by the driver;
  number of the new customers solicited by the driver;
  number of preset locations and/or routes, which have been traveled with the motor vehicle;
  total distance traveled with the motor vehicle;
  average consumption of the motor vehicle;

duration, which has been traveled with open top of the motor vehicle.

For example, by data being collected with respect to the retrofitting, maintenance and/or service works performed on the motor vehicle, an automobile manufacturer can extract important information to the effect with which frequency and regularity respective customers make use of such offers of a certain automobile manufacturer. Further, data about respective states of the relevant motor vehicle can also be collected since it is preferably also acquired and transmitted to the database in this context.

By data of evaluations delivered by the driver with respect to the performed retrofitting, maintenance and/or service works being collected, in particular information with respect to the customer satisfaction can be collected.

Further, data with respect to the number of the new customers solicited by the driver can also be collected and rewarded via the bonus system.

In that data with respect to the number of preset locations and/or routes having been traveled with the motor vehicle can also be acquired and be transmitted to the database, important information with respect to the specific utilization behavior of the motor vehicle can also be collected. This information can for example in turn be introduced into the development of new motor vehicles.

Further, information or data about total distances traveled with the motor vehicle and average consumptions of the motor vehicle is also acquired. This also contributes to the fact that in particular the vehicle manufacturer can obtain important operating information about the motor vehicle, which also can result in technical improvements in the development of following vehicle generations. Moreover, the duration, which has for example been traveled with open top of the motor vehicle, thus in the case of a convertible, can also be acquired. Such information can for example also again enter the development of new vehicles, for example to collect information about occurring loads on the top from the respectively acquired durations of the hours traveled with open top.

A further advantageous embodiment provides that the acquired data on the vehicle side is transmitted to a communication device of the motor vehicle, wherein the data is transmitted either directly to the database or to the mobile terminal, which subsequently transmits the data to the database, by the communication device. In the first alternative, the advantage is in that even if the driver should not carry his mobile terminal in the vehicle, the acquired data can be directly provided to the database. The advantage in the second alternative is in that if a transmission from the communication device directly to the database should currently not be possible, this data is at least transmitted to the mobile terminal, by which the data can be particularly fast and comfortably transmitted to the database for example upon existence of a broadband connection.

According to a further advantageous embodiment, it is provided that data on the vehicle side of at least one further motor vehicle of the driver is acquired and transmitted to the database, wherein this data is also taken into account in creating the electronic life career and the assignment of the bonus points. In other words, thus, a cross-vehicle electronic life career for one and the same driver is created. Therein, it is both possible that such data Is taken into account when a driver for example should possess and drive two or more motor vehicles at the same time. For example, this could be the case if the driver has an antique car, which he only moves in good weather—for example only in summer—and also possesses a further motor vehicle for the daily use or for the winter months. Similarly, it is also possible that if the driver always possesses and drives only a single motor vehicle, the electronic life career is extrapolated over the motor vehicles respectively used one after the other. In this case, it is precisely not a matter of restricting the electronic life career only to the driver-specific motor vehicle life cycle, instead, the electronic life career is extrapolated over the entire driver career or driver history in cross-vehicle manner.

A further advantageous embodiment provides that the application is synchronized with the database and at least one of the following information is displayed by the application:

the electronic life career;
the number of the bonus points assigned to the driver account;
indications of achieved preset events;
which benefits can be redeemed by the bonus points assigned to the driver account;
how many bonus points are required for which benefits;
how many bonus points are assigned to the driver account for which preset events.

Preferably, all of the information relevant to the bonus system can be displayed to the driver by the application. In that the application is continuously synchronized with the database, it can be ensured that the driver can substantially always get provided all of the current information with respect to the bonus system. Therein, the application can of course also be operated on another mobile terminal of the driver, wherein a synchronization with the database is then also effected such that the driver also further gets provided all of the information with respect to the bonus system upon change of his mobile terminal, for example a smart phone. Moreover, it is also possible that the application or a correspondingly adapted application can also be installed and operated on further electronic appliances such as for example tablet computers, notebooks or conventional personal computers. In this case, a synchronization of all of the electronic appliances with the database is also effected such that the same and current information with respect to the bonus system can always be provided on all appliances.

In further advantageous development, it is provided that at least a part of the bonus points assigned to the driver account is transferred to another driver account. For example, the driver can transfer a certain number of bonus points to another driver account, for example of a friend, a relative or the like, by corresponding operation of the application. Thereby, other persons can also benefit from the collected bonus points. Thereby, for example, a particular stimulation can be provided for new customers to also extensively use this application with corresponding data releases. Moreover, this can also contribute to the customer retention since drivers, who are not yet so long existing customers of the relevant automobile manufacturer, optionally can already access to a diverse and attractive benefit spectrum of the relevant automobile manufacturer by the donated bonus points. This optionally motivates them to continue their own electronic life career also as long as possible at this automobile manufacturer.

In further advantageous development, it is provided that at least one of the following benefits can be redeemed by the bonus points:

discounts in purchasing a new motor vehicle;
discounts in purchasing accessory and/or repair parts;
fuel coupons;
absorption of driver license costs;
free travels with various vehicle models.

Thus, diverse benefits are preferably offered on the part of an automobile manufacturer, which the driver, thus the user of the bonus system, can exchange for his bonus points. For example, a driver, who has collected sufficient bonus points, can use a certain vehicle model of an automobile manufacturer for a preset duration and/or preset distance for free for redemption of these bonus points. Alternatively, the driver can also provide his collected bonus points to another person such that this person gets provided a certain vehicle model of the relevant automobile manufacturer for a certain duration and/or distance for free.

The bonus system proposed by the inventor includes a database, which is formed to provide a driver account associated with a driver. Furthermore, the bonus system has an application installed on at least one mobile terminal, which is formed to acquire data relating to the driver and to transmit it to the database. In addition, the bonus system includes at least one acquisition device on the motor vehicle side, which is formed to acquire data on the vehicle side of at least one motor vehicle of the driver and to transmit it at least indirectly to the database. Finally, the bonus system also has a data processing device, which is formed to create an electronic life career associated with the driver account based on the data transmitted to the database. Moreover, the data processing device is formed to respectively assign preset bonus points to the driver account as soon as it has been acquired based on the electronic life career that respective preset events have been achieved, wherein preset benefits can be redeemed by the application depending on the bonus points assigned to the driver account. Therein, advantageous developments of the method are to be considered as advantageous developments of the bonus system, wherein the bonus system in particular performs the method.

The features and feature combinations mentioned above in the description as well as the features and feature combinations mentioned below in the description of figures and/or shown in the figures alone are usable not only in the respectively specified combination, but also in other combinations or alone without departing from the scope of the proposals.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
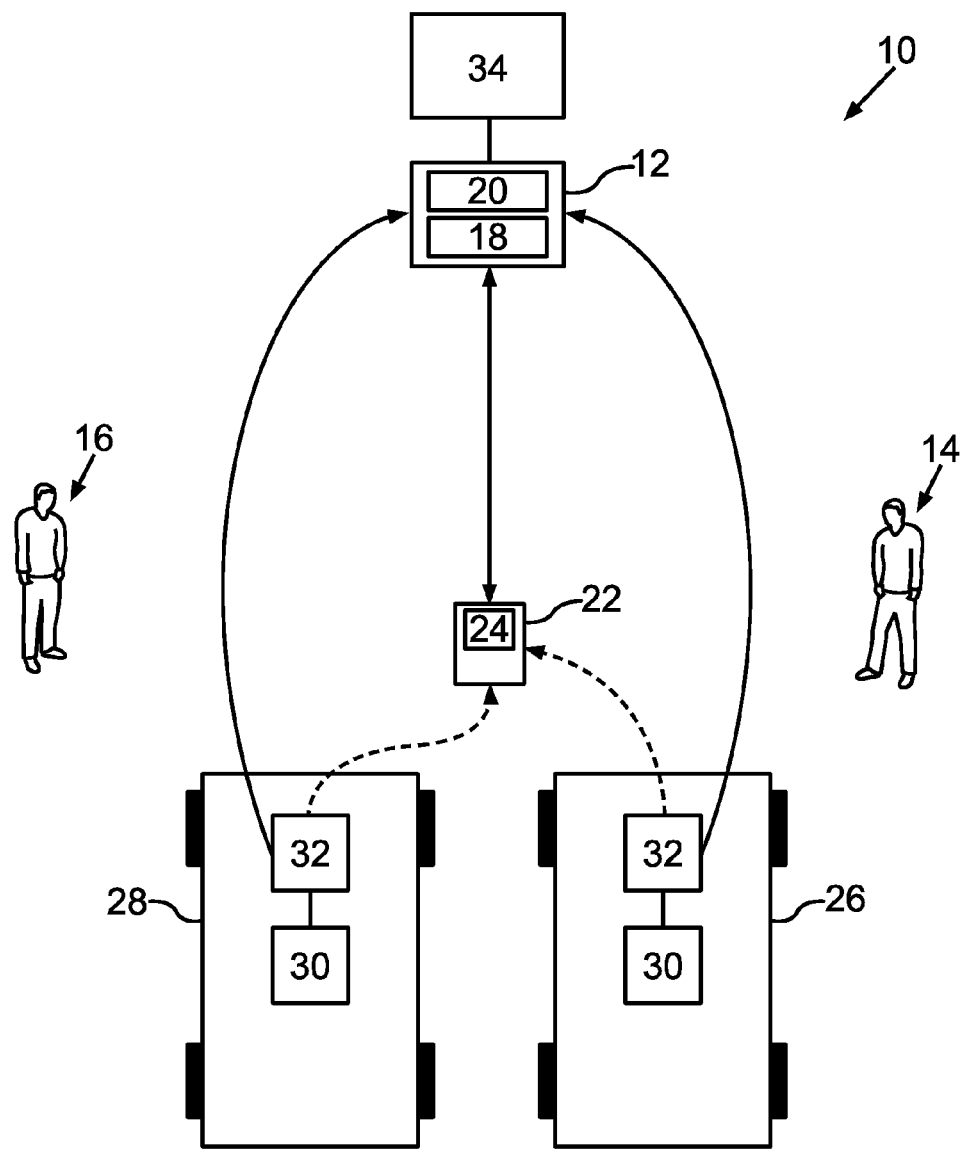
FIG. 1 a schematic illustration of two motor vehicles, a mobile terminal, a database and a data processing device, by which a bonus system is operable; and in FIG. 2 a schematic illustration of an electronic life career with correspondingly highlighted events, which is part of the bonus system.

Reference will now be made in detail to the preferred embodiments of the present invention, examples of which are illustrated in the accompanying drawings, wherein like reference numerals refer to like elements throughout.

A bonus system 10 is shown in a schematic illustration in FIG. 1. The bonus system 10 includes a database 12, which is formed to provide respective driver accounts 18, 20 associated with different drivers 14, 16. Furthermore, the bonus system 10 includes multiple applications 24 installed on respective mobile terminals 22, preferably on smart phones, which are formed to acquire data relating to the respective drivers 14, 16 and to transmit it to the database 12. For a simplified illustration, only one mobile terminal 22 is illustrated in the present case.

Furthermore, two motor vehicles 26, 28 are illustrated, which presently both belong to the driver 14. The bonus system 10 includes respective acquisition devices 30 on the motor vehicle side, which are formed to acquire data on the vehicle side of the respective motor vehicles 26, 28 of the driver 14 and to transmit it at least indirectly to the database 12. For transmitting the data each on the vehicle side, the motor vehicles 26, 28 have respective communication devices 32, which are formed to wirelessly communicate the data on the motor vehicle side to the database 12. In addition, the communication devices 32 can also be formed such that they do not directly transmit the data on the motor vehicle side to the database 12, and instead transmit the data to the smart phone 22, which in turn transmits this data to the database 12. Therein, all of the data transmissions are preferably wirelessly effected.

Furthermore, the bonus system 10 includes a data processing device 34 coupled to the database 12, which is formed to create respective electronic life careers associated with the driver accounts 18, 20 based on the data transmitted to the database 12. Further, the data processing device 34 is adapted to respectively assign preset bonus points to the respective driver accounts 18, 20, as soon as it has been acquired based on the respective electronic life careers that respective preset events have been achieved, wherein preset benefits can be redeemed by the application 24 depending on the bonus points assigned to the respective driver accounts 18, 20.

Figure 2:
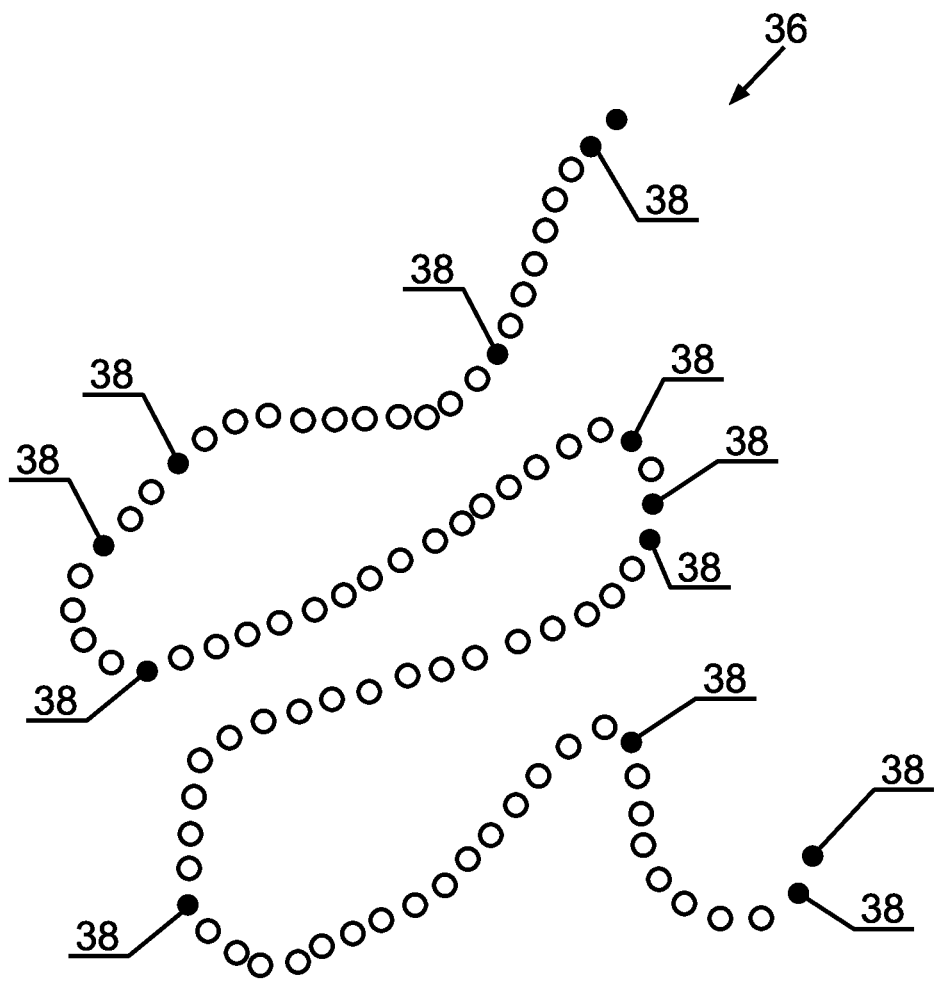

In FIG. 2, an electronic life career 36 is exemplarily illustrated, which has for example been created for the driver 14. Some events 38 are exemplarily indicated, which the driver 14 has achieved. These events can for example include a delivery of a certain motor vehicle in a new car center, a first service, which has been performed on the motor vehicle, traveling in five certain major cities with the motor vehicle, the equipment of the motor vehicle with accessories such as for example rear spoilers or the like, traveling on a certain race course, the travel of for example 100,000 km with the motor vehicle, a repair of the motor vehicle after a slight accident, a solicited new customer, a second service for the motor vehicle, an average consumption undershot over a certain period of time, the purchase of a new motor vehicle and the like.

Therein, different bonus points are assigned to the respectively achieved preset events 38 or milestones and credited to the user account 18 of the driver.

For example, the continuous continuation of the electronic life career 36 over thirty years can result in the fact that for example a grandchild of the driver 14 receives a driver license for free as a present or gets credited as many bonus points as the driver 14 can redeem them at the relevant automobile manufacturer for payment of the driver license of his grandchild by the automobile manufacturer.

For example, it is also conceivable that certain accessories are available to the driver 14 for free with a newly solicited customer for the relevant automobile manufacturer or that he obtains as many bonus points as he can exchange certain accessories for these bonus points.

For example, if it should be determined based on the electronic life career that the driver 14 should have undershot a preset average consumption, for example of 5 l/100 km, over a certain period of time with one of his motor vehicles 26, 28, the driver 14 e.g. gets credited a fuel coupon and a free visit in a museum of the relevant automobile manufacturer or the equivalent number of bonus points such that he can redeem these benefits.

Moreover, it is for example also possible that as soon as it is determined based on the electronic life career 36 that the driver 14 for example has traveled 1,000,000 km with multiple vehicles of the same automobile manufacturer, he is allowed to travel a free drive with a particularly exclusive vehicle of the manufacturer on a race course or that the driver 14 gets credited as many bonus points to his driver account 18 as he can redeem the previously mentioned benefit.

Based on further exemplary examples, below, it is now explained how the bonus system 10 can also be operated.

For example, the driver 14 has just purchased a new motor vehicle. At home, he sets up this motor vehicle 26 and activates the previously already mentioned application both in this motor vehicle 26 and on his smart phone 22. As a first milestone, the driver 14 then has for example already achieved the delivery of the relevant motor vehicle 26 in a delivery center of the automobile manufacturer. Subsequently, a window or an information appears within the life career 36, which is for example displayed by the smart phone 22, in which the driver 14 may evaluate the satisfaction with respect to the purchase on a grade scale from 1 to 6. In addition, he also gets the possibility of leaving a comment by the application installed on the smart phone 22.

Two years later, the driver 14 has a slight accident with his motor vehicle 26 and his motor vehicle 26 is repaired in a service center or in a repair shop of the relevant automobile manufacturer. Thereupon, he again has the possibility of evaluating the satisfaction about the service and the repair by the application 24 installed on his smart phone 22 and correspondingly registering it in a milestone 38 of his life career 36. Based on this first explained example, it becomes clear that an automobile manufacturer providing and operating the bonus system 10 can read out a plurality of information, which the driver 14 provides, and thus can draw conclusions of the user behavior and the satisfaction of the driver 14.

In a further example, it is assumed that the driver 14 is the father of the other driver 16. In this example, it is to be assumed that the driver 14 already drives his fourth motor vehicle from the same automobile manufacturer. The father 14 goes to a sales center of the automobile manufacturer since another customer has recommended him a certain vehicle by the application 24, which this customer also uses. The relevant vehicle was already configured by the application 24 and the driver 14 would automatically obtain a discount of for example 14% upon purchase of a new car at this automobile manufacturer.

Since the driver 14 maintains his electronic life career 36 already since 20 years and has already achieved 17 different milestones or events 38, he donates his discount to his son 16. This one obtains for example 28% of discount upon purchase of a certain motor vehicle for his young family.

Thus, the driver 14 can transfer the bonus points or discounts credited to his driver account 18 to his son 16 to the driver account 20, which is associated with the son 16 in this example. Both the driver 14 and his son 16 each purchase a new car, wherein the driver 14 pays the list price and his son 16 the price discounted by 28%. Thus, it is apparent for both that corresponding discounts for motor vehicles of the automobile manufacturer can be acquired by milestones or achieved events 38 in the electronic life career 36. The bonus system 10 or the manner how the bonus system 10 is operated is thus particularly transparent.

For the next example, it is to be assumed that the driver 14 has an 18 years old granddaughter 16. The driver 14 is to be 59 years old and possesses a certain motor vehicle model since five years in the present example. The motor vehicle manufacturer operating the bonus system 10 analyzes the electronic life career 36 of the driver 14 and specifically controls a milestone or an event 38 for the driver 14. This milestone is: "Purchase of a new motor vehicle of the relevant automobile manufacturer".

If the driver 14 achieves the corresponding milestone and pays the full list price, he can donate a 6-month leasing of a certain motor vehicle model of the relevant automobile manufacturer to a person of his choice.

For example, the driver 14 could make this present to his granddaughter 16, who has just become full-aged. Thereafter, the granddaughter 16 optionally appreciates the leased motor vehicle model as much as the parents of the granddaughter 16 buy a new motor vehicle of the same model for her.

In the example, the driver 14 thus has purchased a new motor vehicle and additionally also generated a new customer in the form of the granddaughter 16. Optionally, the driver 14 then also obtains a free service for his newly purchased vehicle for free as a bonus or the bonus points required thereto are credited to his driver account.

In the next example, it is to be assumed that the driver 14 is relatively wealthy and has a friend 16. In the present example, the driver 14 has a particularly long electronic life career 36, drives a particularly luxurious model of the relevant automobile manufacturer operating the bonus system 10 and has already purchased ten different models of the relevant automobile manufacturer. In this example, the driver 14 purchases a new motor vehicle of the same automobile manufacturer every three years. By his active lifestyle, the driver 14 has also purchased much accessory, made use of many repair and service performances of the automobile manufacturer in his electronic life career 36 and thus has a plurality of achieved milestones or events 38 in his electronic life career 36.

Optionally, the driver has also registered an antique car of the same automobile manufacturer in his electronic life career 36, wherein he is particularly proud of it. Since the driver 14 now wants to purchase a further particularly luxurious model of the automobile manufacturer, he presses the milestone "purchase of a new model" in the application 24. Here, the driver 14 obtains a discount of 25% due to his numerous milestones or achieved events 38.

The driver 14 is proud of his success, however, he is also a good human as well. He wants to give a treat to his acquaintance 16, who does not have so much success. Therefore, he donates his 25%, which he would obtain for the luxurious model, to his friend 16. The driver 14 thus pays the full list price and his friend 16 obtains 25% of discount to a mid-range model of his choice and is delighted. The automobile manufacturer overall earns more because absolutely considered, the discount of 25% is lower in the mid-range model than in the more expensive luxurious model.

In the last following example, it is to be assumed that the driver 14 is already customer of a certain automobile manufacturer operating the bonus system 10. In contrast, it is to be assumed that the person 16 is not yet customer at this automobile manufacturer.

However, the person 16 can load the application 24 for example to his tablet computer and clicks on a menu item displayed there "I'm interested in a certain model of this vehicle manufacturer". This information is sent to the database 12 together with a coarse statement of place in anonymous manner. The driver 14 wants to buy a further new model of the relevant vehicle manufacturer. In order to achieve 16% of discount, he knows that he still has to solicit a customer. The driver 14 subsequently clicks on a menu item within his application 24 "milestone: present my motor vehicle to a person". This action of the driver 14 is in turn transmitted to the database 12. Therein, it is recognized that the driver 14 currently drives such a vehicle model, in which the person 16 is interested. The two persons 14, 16 are thus for example connected to each other via the application 24 and the driver 14 can offer the inspection of his vehicle model to the person 16, wherein the person 16 does a test drive straight away.

Since the driver 14 is confident of his vehicle on his own accord as a customer of the relevant automobile manufacturer and additionally has the wish to obtain the additional discount for purchasing the new vehicle, he can simply transfer his excitement to the person 16. In addition, the driver 14, who has exactly informed about his current vehicle, can pass valuable information, in particular from the customer's point of view, to the person 16. Thus, it comes naturally to the driver 14 since he executes this activity as a kind of voluntary car salesman not the entire day but for example only for one hour in contrast to a conventional employed car salesman. Subsequently, the person 16 configures the relevant vehicle model by the application 24 installed on his tablet computer and orders it still on the same evening, for example also via the application 24. Subsequently, he can fetch the newly configured vehicle in three months in a corresponding service center of the relevant automobile manufacturer.

Thus, the person 16 is happy about his new car and does not have to especially drive to a car dealership of the corresponding manufacturer to this and conduct a conversation with a car salesman. In this example, the driver 14 acts in turn on own motivation as a car salesman and is again rewarded by the relevant automobile manufacturer via the bonus system.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of operating a motor vehicle system, comprising:
   acquiring driver data using input from a driver on an application installed on a mobile terminal;
   transmitting the driver data to a database;
   using the driver data transmitted to the database to associate the driver with at least one motor vehicle from a motor vehicle manufacturing group;
   only for each motor vehicle from the motor vehicle manufacturing group, acquiring motor vehicle data for the driver if the motor vehicle is associated with the driver, the motor vehicle data relating to operation of the motor vehicle only while associated with the driver, the motor vehicle data being obtained using at least one acquisition device provided on the motor vehicle;
   transmitting the motor vehicle data to the database;
   creating electronic life career data based on motor vehicle data for each motor vehicle associated with the driver and based on the driver data;
   storing the electronic life career data in the database in association with a driver account for the driver; and
   assigning a bonus point to the driver account, based on the electronic life career data when determining an event triggering the bonus point has occurred, wherein a benefit from the motor vehicle manufacturing group which is redeemable based on the bonus point is assigned to the driver account, wherein
   the motor vehicle data is continuously collected for the electronic life career data when the driver drives different vehicles also belonging to the motor vehicle manufacturing group, and
   the electronic life career data is maintained over time, for different vehicles associated with the driver, that are from the motor vehicle manufacturing group.

2. The method according to claim 1, wherein acquiring motor vehicle data includes at least one of:
   obtaining information on at least one of retrofitting, maintenance and service work performed on the motor vehicle,
   obtaining an evaluation delivered by the driver with respect to the at least one of the retrofitting, maintenance and service work,
   obtaining a number of new customers solicited by the driver,
   obtaining at least one of a location and a route traveled by the motor vehicle,
   obtaining a total distance traveled with the motor vehicle,
   obtaining an average consumption of the motor vehicle, and
   obtaining a duration during which the motor vehicle has traveled while a predetermined vehicle system was in operation.

3. The method according to claim 2, wherein transmitting the motor vehicle data comprises:
   transmitting the motor vehicle data to a communication device of the motor vehicle; and
   transmitting the motor vehicle data from the communication device to the database, either directly or through the mobile terminal.

4. The method according to claim 1, wherein transmitting the motor vehicle data comprises:
   transmitting the motor vehicle data to a communication device of the motor vehicle; and
   transmitting the motor vehicle data from the communication device to the database, either directly or through the mobile terminal.

5. The method according to claim 1, wherein
   the application is synchronized with the database, and
   the application displays on the mobile terminal at least one of the electronic life career data, a number of bonus points assigned to the driver account, an indication of an achieved event having a benefit redeemable based on the bonus points assigned to the driver account, an indication of a number of bonus points required for a benefit, and an indication of bonus points assigned to the driver account for predetermined corresponding events.

6. The method according to claim 1, further comprising:
   transferring at least a part of the bonus point assigned to the driver account to another driver account.

7. The method according to claim 1, wherein the benefit redeemable based on the bonus point includes at least one of:
   a discount in purchasing a new motor vehicle, a discount in purchasing one of an accessory and a repair part, a fuel coupon, an absorption of a driver license cost, and free travel with various vehicle models.

8. The method according to claim 1, wherein acquiring motor vehicle data includes
obtaining a duration during which the motor vehicle has traveled in a convertible-top-open condition.

9. The method according to claim 1, wherein the driver data and the motor vehicle data are transmitted to the database along respective transmission paths, which are at least partially separate.

10. The method according to claim 1, wherein the application is synchronized with the database, and the application displays on the mobile terminal at least one of the electronic life career data, a number of bonus points assigned to the driver account, an indication of an achieved event having a benefit redeemable based on the bonus points assigned to the driver account, an indication of a number of bonus points required for a benefit, and an indication of bonus points assigned to the driver account for predetermined corresponding events.

11. The method according to claim 10, further comprising:
transferring at least a part of the bonus point assigned to the driver account to another driver account.

12. The method according to claim 11, wherein the benefit redeemable based on the bonus point includes at least one of:
a discount in purchasing a new motor vehicle,
a discount in purchasing one of an accessory and a repair part,
a fuel coupon,
an absorption of a driver license cost, and
free travel with various vehicle models.

13. A tracking apparatus comprising:
an application installed on a mobile terminal, to acquire driver data relating to a driver and to transmit the driver data;
a database to receive the driver data from the application installed on the mobile terminal, to associate the driver with at least one motor vehicle from a motor vehicle manufacturing group and to store information of a driver account relating to the driver and each motor vehicle associated with the driver and belonging to the motor vehicle manufacturing group;
an acquisition device only for each motor vehicle from the motor vehicle manufacturing group, to acquire motor vehicle data for the driver if the motor vehicle is associated with the driver, the motor vehicle data relating to operation of the motor vehicle only while associated with the driver;
a transmitter to transmit the motor vehicle data to the database; and
a data processing device configured to:
create electronic life career data associated with the driver account based on the driver data and based on the motor vehicle data for each motor vehicle associated with the driver, only while associated with the driver; and
assign respectively preset bonus points to the driver account when the electronic life career data indicates that respective preset events have been achieved, such that the bonus points can be redeemed for preset benefits from the motor vehicle manufacturing group using the application installed on the mobile terminal, wherein
the motor vehicle data is continuously collected for the electronic life career data when the driver drives different vehicles also belonging to the motor vehicle manufacturing group, and
the electronic life career data is maintained over time, for different vehicles associated with the driver, that are from the motor vehicle manufacturing group.

14. The tracking apparatus according to claim 13, comprising:
continuously collecting the motor vehicle data when the motor vehicle belongs to an automobile group and the driver continues to drive motor vehicles belonging to the motor vehicle group.

15. A method of operating a motor vehicle system, comprising:
acquiring driver data using input from a driver on an application installed on a mobile terminal;
transmitting, by the application installed on the mobile terminal, the driver data to a database;
using the driver data transmitted to the database to associate the driver with at least one motor vehicle from a motor vehicle manufacturing group;
only for each motor vehicle from the motor vehicle manufacturing group, acquiring motor vehicle data for the driver if the motor vehicle is associated with the driver, the motor vehicle data relating to operation of the motor vehicle only while associated with the driver, the motor vehicle data being obtained using at least one acquisition device provided on the motor vehicle;
transmitting, by the at least one acquisition device, the motor vehicle data to the database;
creating, by a data processing device, electronic life career data based on motor vehicle data for each motor vehicle associated with the driver and based on the driver data;
storing, by the data processing device, the electronic life career data in the database in association with a driver account for the driver; and
assigning, by the data processing device, a bonus point to the driver account, based on the electronic life career data when determining an event triggering the bonus point has occurred, wherein a benefit from the motor vehicle manufacturing group which is redeemable based on the bonus point is assigned to the driver account, wherein
the motor vehicle data is continuously collected for the electronic life career data when the driver drives different vehicles also belonging to the motor vehicle manufacturing group, and
the electronic life career data is maintained over time, for different vehicles associated with the driver, that are from the motor vehicle manufacturing group.

* * * * *